(12) United States Patent
Satake et al.

(10) Patent No.: US 7,549,675 B2
(45) Date of Patent: Jun. 23, 2009

(54) STRADDLE-TYPE VEHICLE

(75) Inventors: Hidenori Satake, Shizuoka (JP);
Satoshi Suzuki, Shizuoka (JP); Shouichi Kubo, Shizuoka (JP); Kyouei Miura, Shizuoka (JP); Masahiro Noda, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 294 days.

(21) Appl. No.: 11/557,933

(22) Filed: Nov. 8, 2006

(65) Prior Publication Data

US 2007/0132225 A1 Jun. 14, 2007

(30) Foreign Application Priority Data

Nov. 8, 2005 (JP) ............... 2005-323446

(51) Int. Cl.
*B60P 3/22* (2006.01)
(52) U.S. Cl. ....................... 280/835; 180/219
(58) Field of Classification Search ......... 180/219; 280/833, 834, 835
See application file for complete search history.

(56) References Cited

U.S. PATENT DOCUMENTS

| 4,796,719 | A | * | 1/1989 | Shiratsuchi | 180/219 |
| 5,040,632 | A | * | 8/1991 | Fujii et al. | 180/219 |
| 5,145,023 | A | | 9/1992 | Yashuyuki et al. | |
| 5,330,028 | A | * | 7/1994 | Handa et al. | 180/219 |
| 5,560,446 | A | * | 10/1996 | Onishi | 180/219 |
| 6,641,169 | B2 | * | 11/2003 | Fukunaga et al. | 280/835 |
| 6,896,293 | B2 | * | 5/2005 | Philipps et al. | 280/833 |
| 6,910,716 | B2 | * | 6/2005 | Kurayoshi et al. | 280/835 |
| 6,971,659 | B2 | * | 12/2005 | Uemoto et al. | 280/304.4 |
| 7,267,193 | B2 | * | 9/2007 | Nagashii et al. | 180/219 |
| 7,284,629 | B2 | * | 10/2007 | Nakano et al. | 180/68.3 |
| 7,390,023 | B2 | * | 6/2008 | Hirose et al. | 280/835 |
| 7,410,191 | B2 | * | 8/2008 | Karube et al. | 280/833 |
| 2001/0022247 | A1 | | 9/2001 | Mori et al. | |
| 2005/0110265 | A1 | | 5/2005 | Miyakozawa et al. | |

FOREIGN PATENT DOCUMENTS

| EP | 1659054 A | 5/2006 |
| JP | 05008780 A | 1/1993 |
| JP | 05-008780 | 11/2006 |

OTHER PUBLICATIONS

European Search Report for counterpart European Application No. 06023268.3 lists the references above.

* cited by examiner

*Primary Examiner*—Tony H. Winner
(74) *Attorney, Agent, or Firm*—Hogan & Hartson LLP

(57) ABSTRACT

A straddle-type vehicle in which a seat is arranged behind a fuel tank has improved layout flexibility behind the fuel tank is improved and allows efficient arrangement of vehicle components. The front of a fuel tank is mounted to right and left main frames via brackets. Brackets separated to the right and left are mounted to seat rails. The fuel tank has, at the rear, right and left ring-shaped brackets mounted to the brackets and an upwardly projecting recess between the right and left ring-shaped brackets. An air cleaner is disposed under the rear of the fuel tank and overlaps the fuel tank in side view.

17 Claims, 12 Drawing Sheets

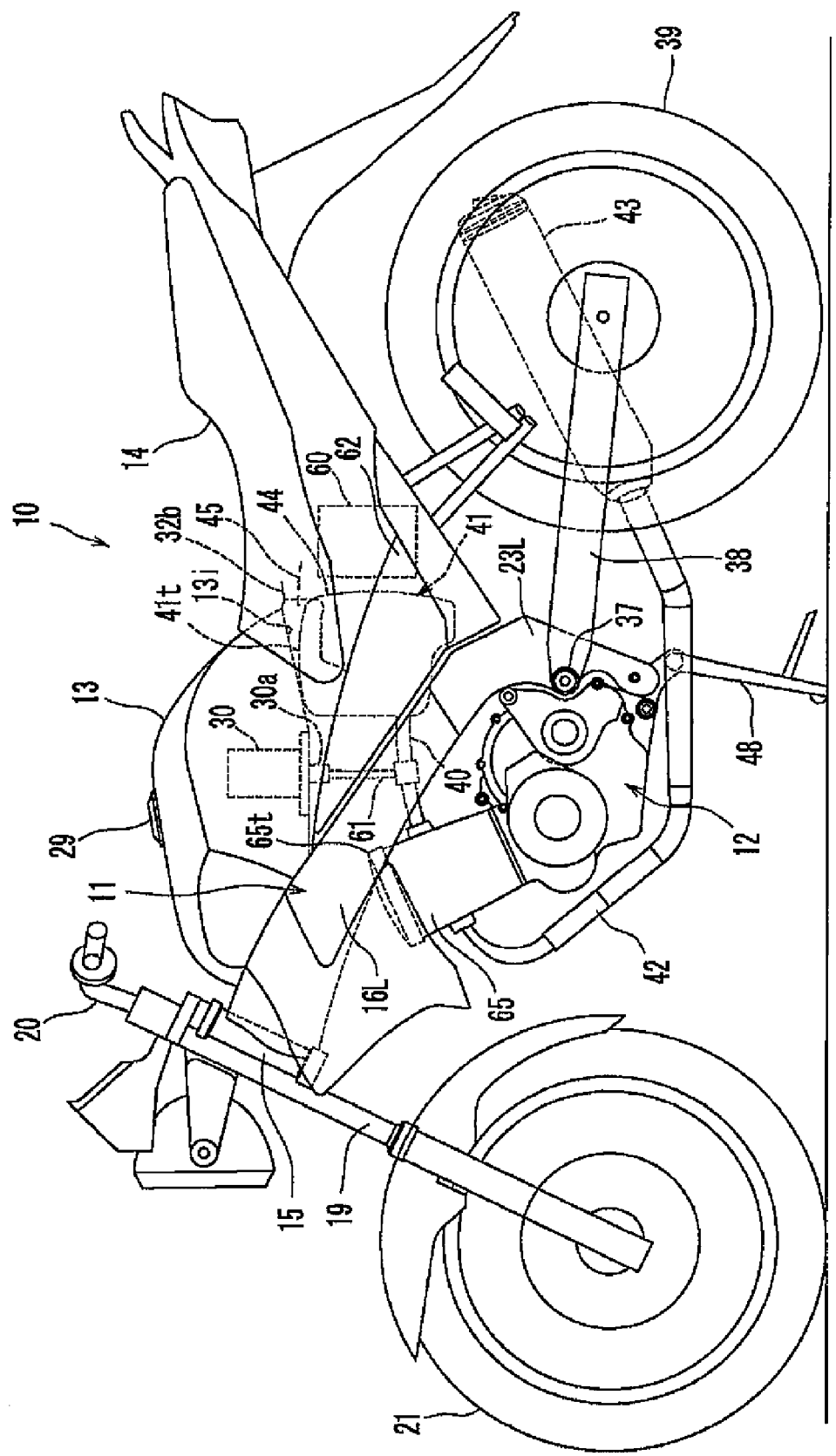
[Fig. 1]

[Fig. 2]
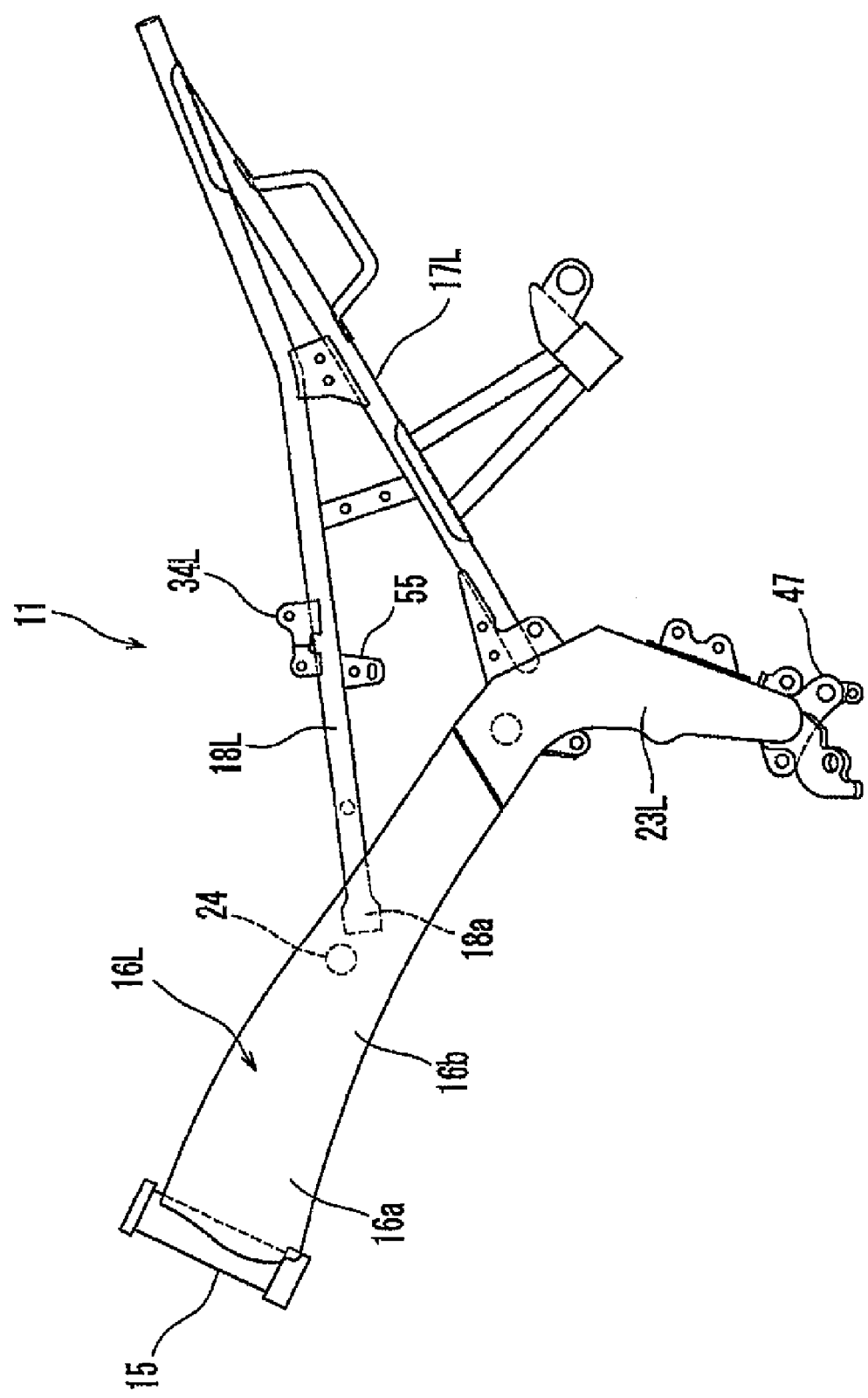

[Fig. 3]
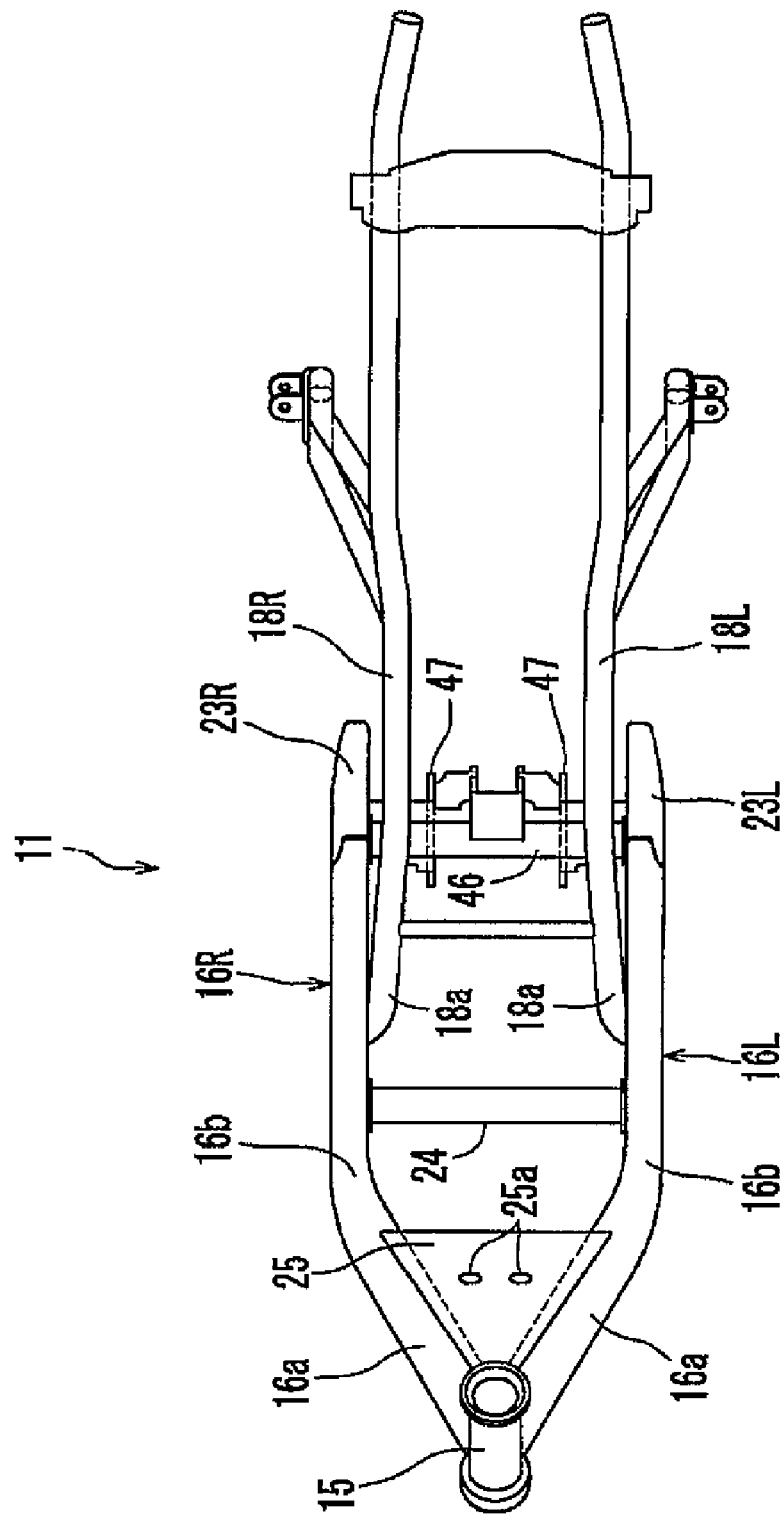

[Fig. 4]
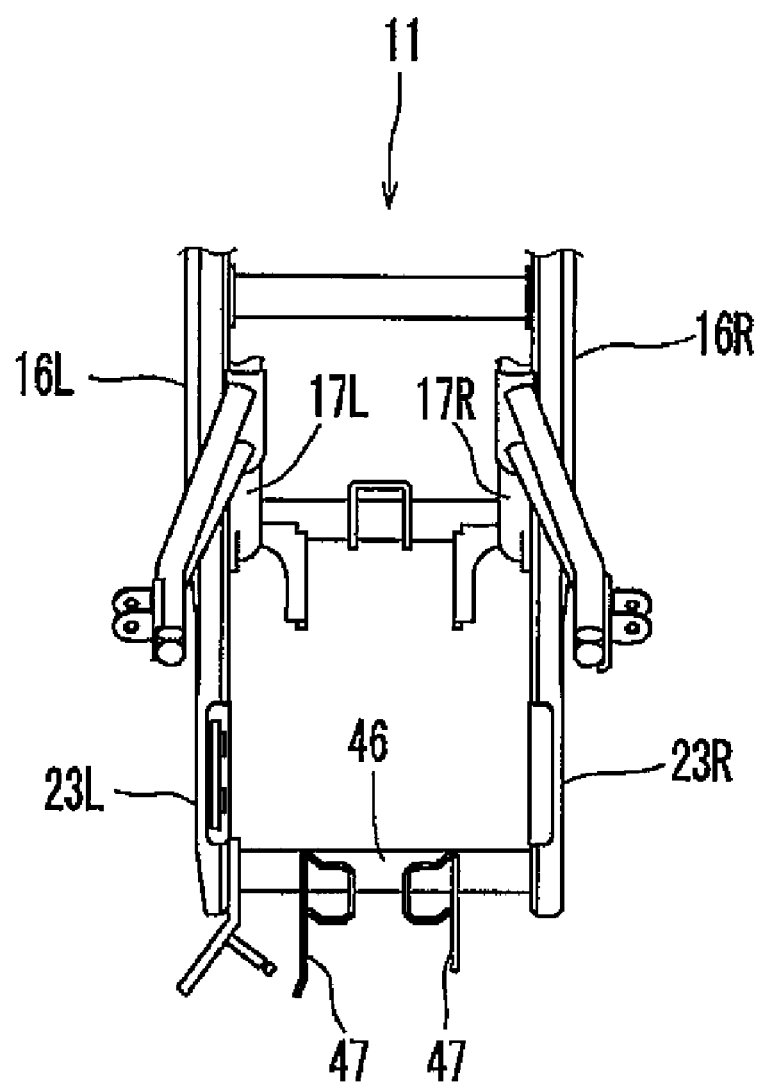

[Fig. 5]
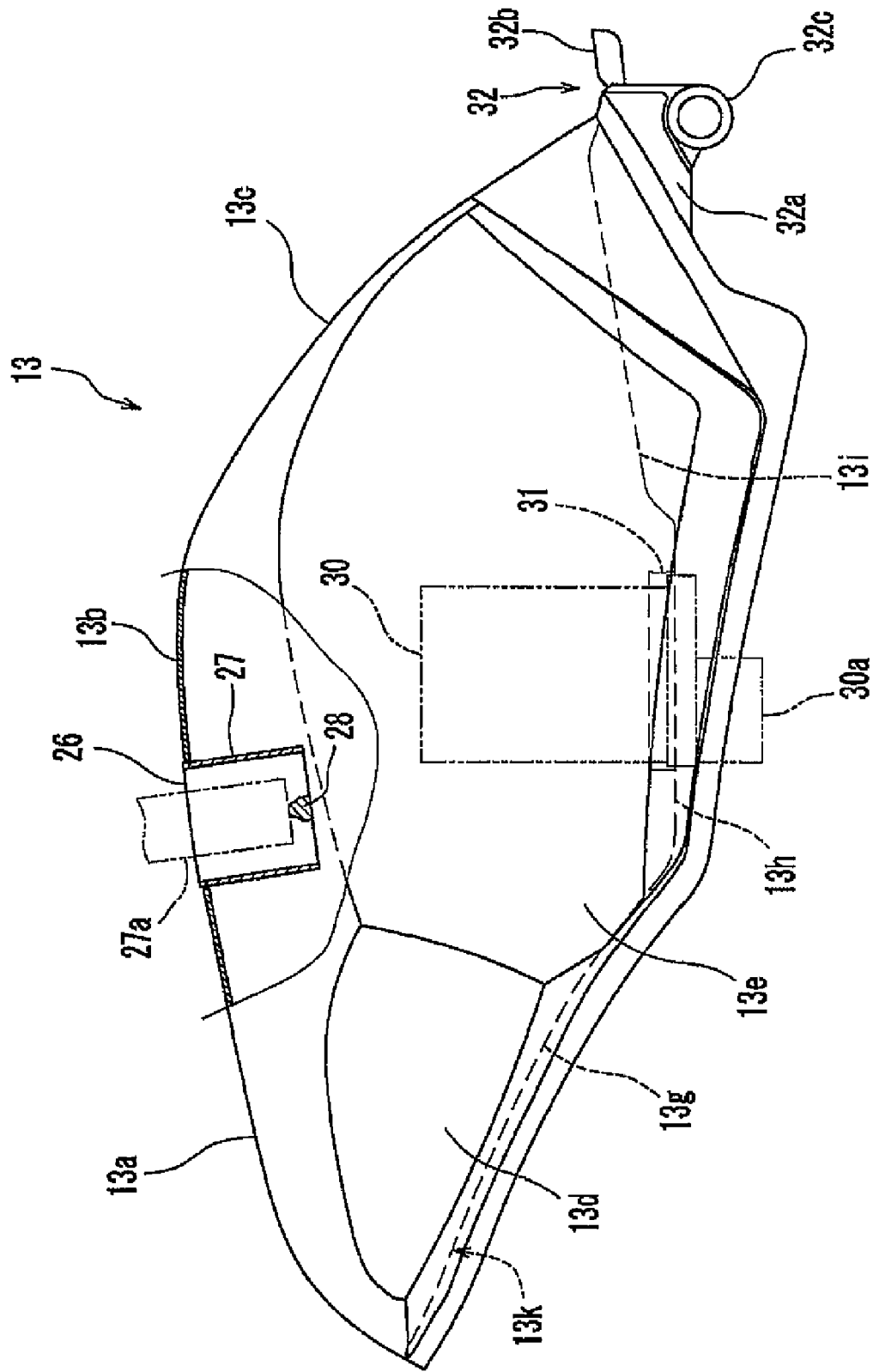

[Fig. 6]
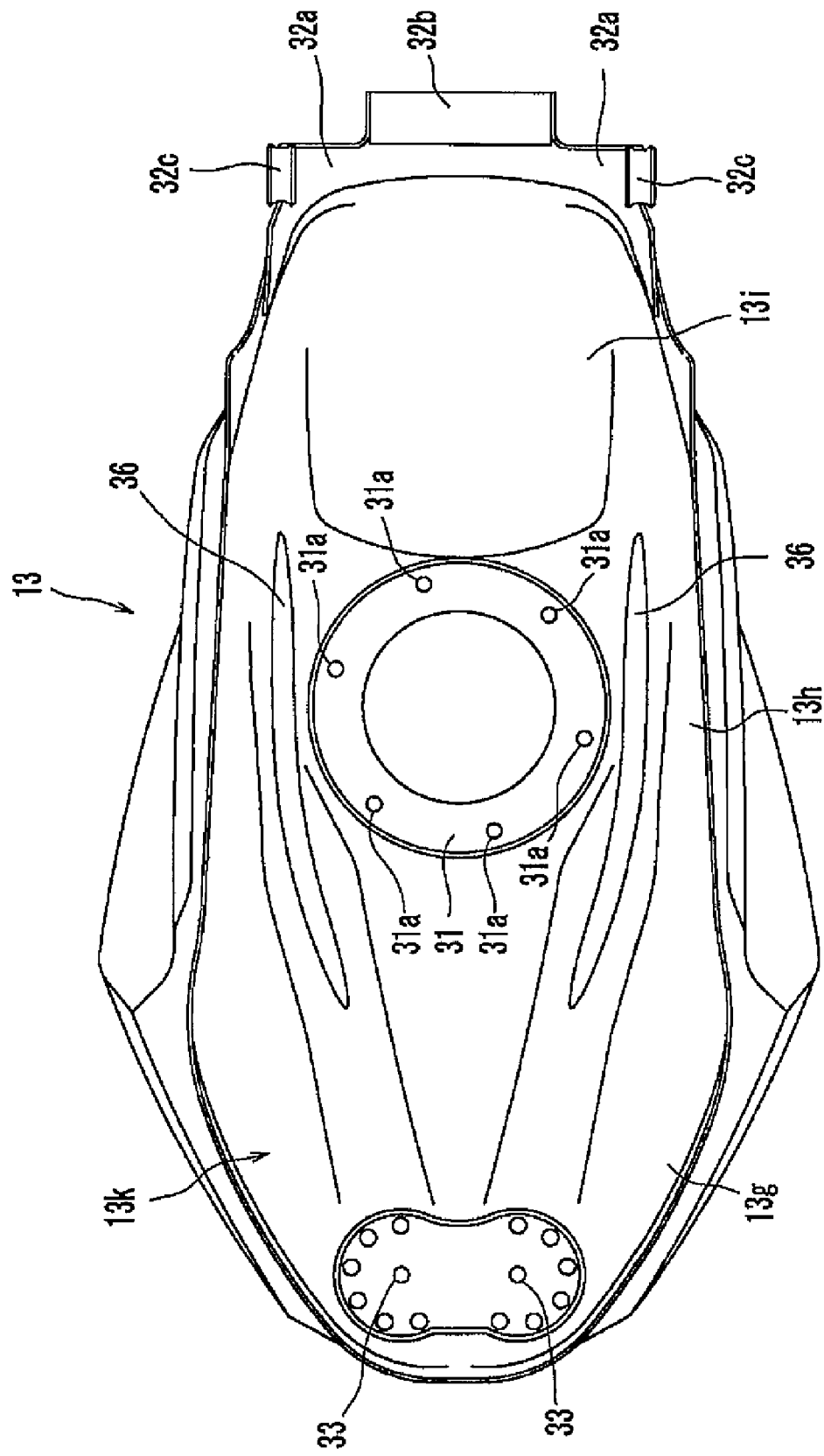

[Fig. 7]
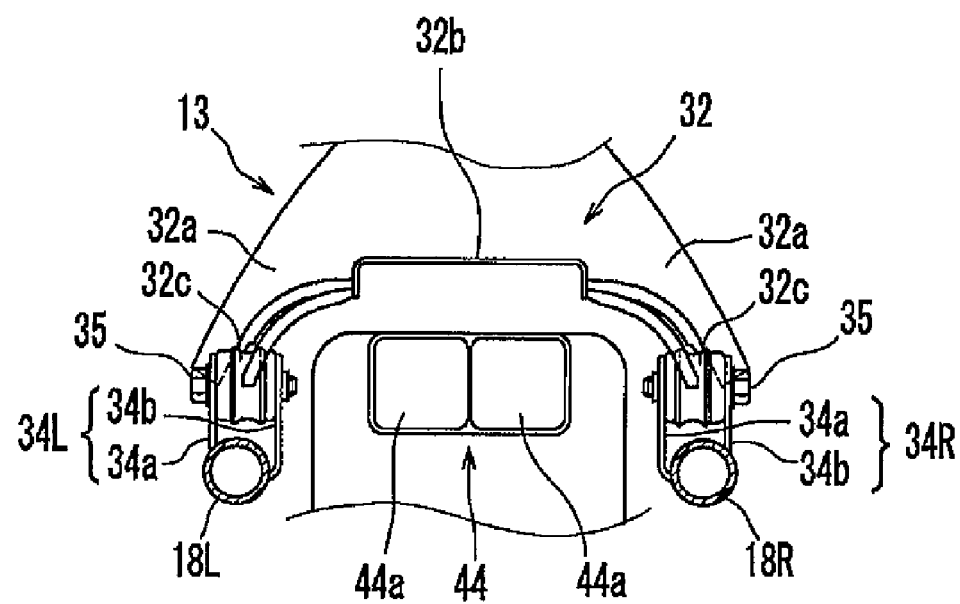

[Fig. 8]
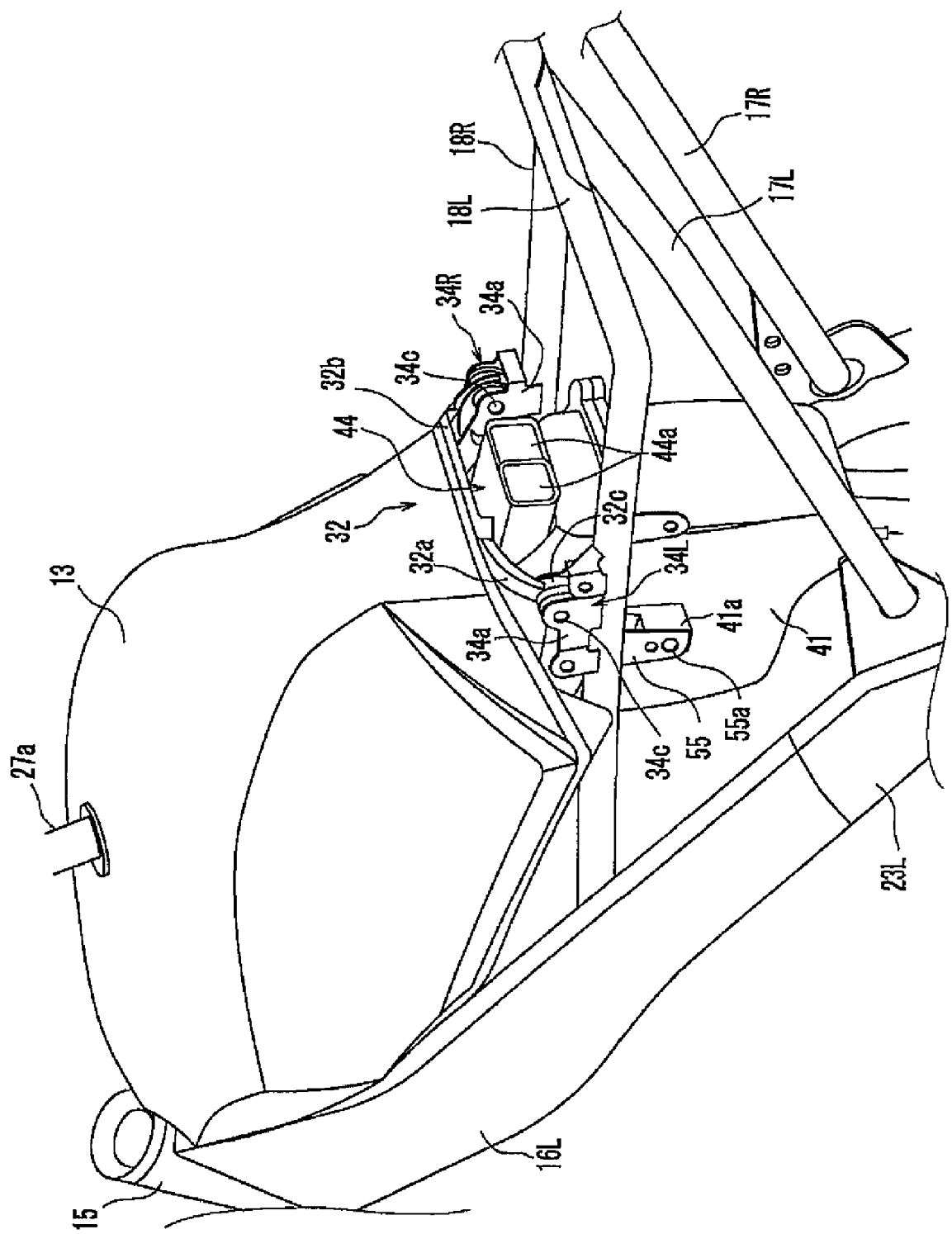

[Fig. 9]
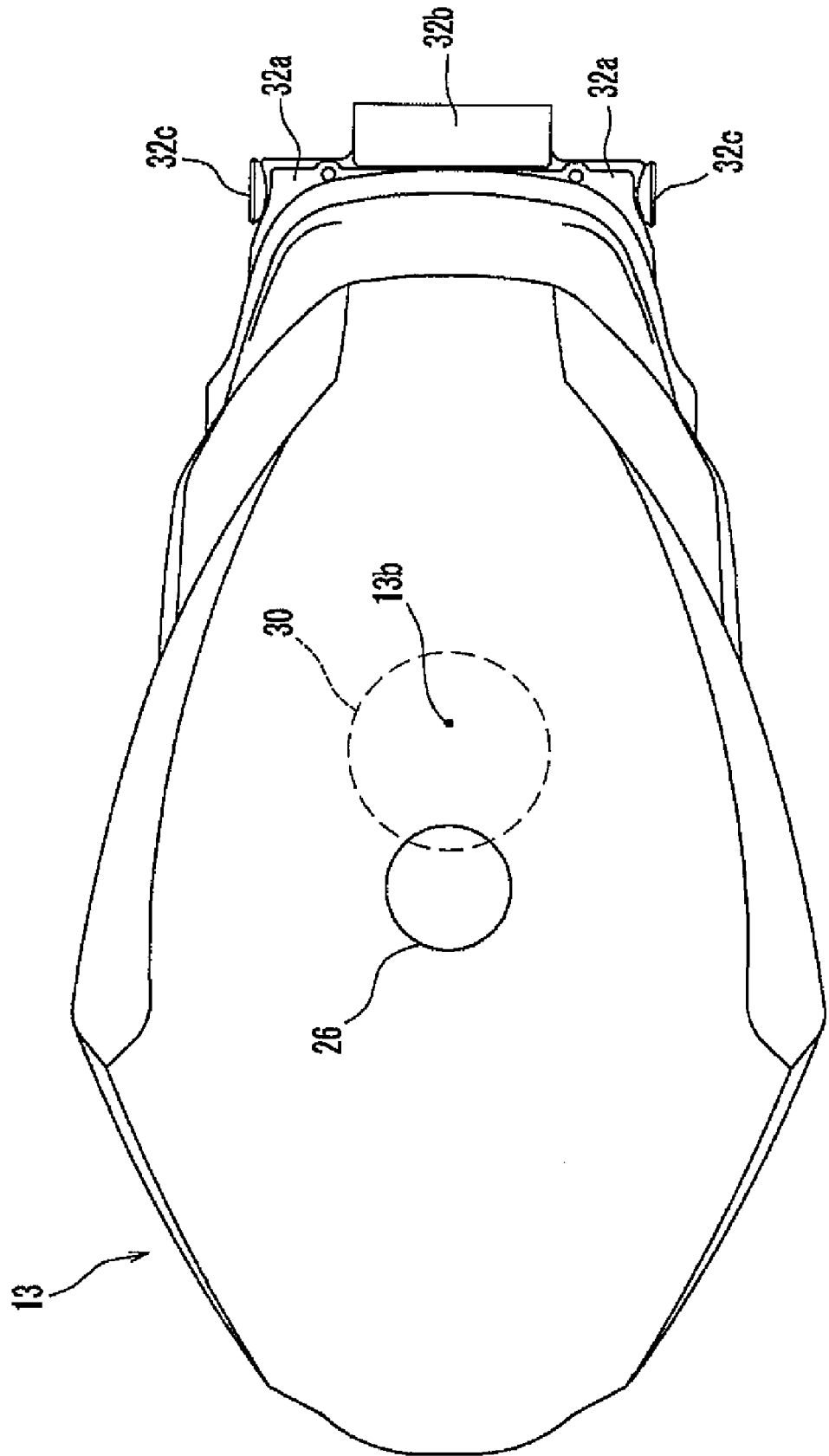

[Fig. 10]
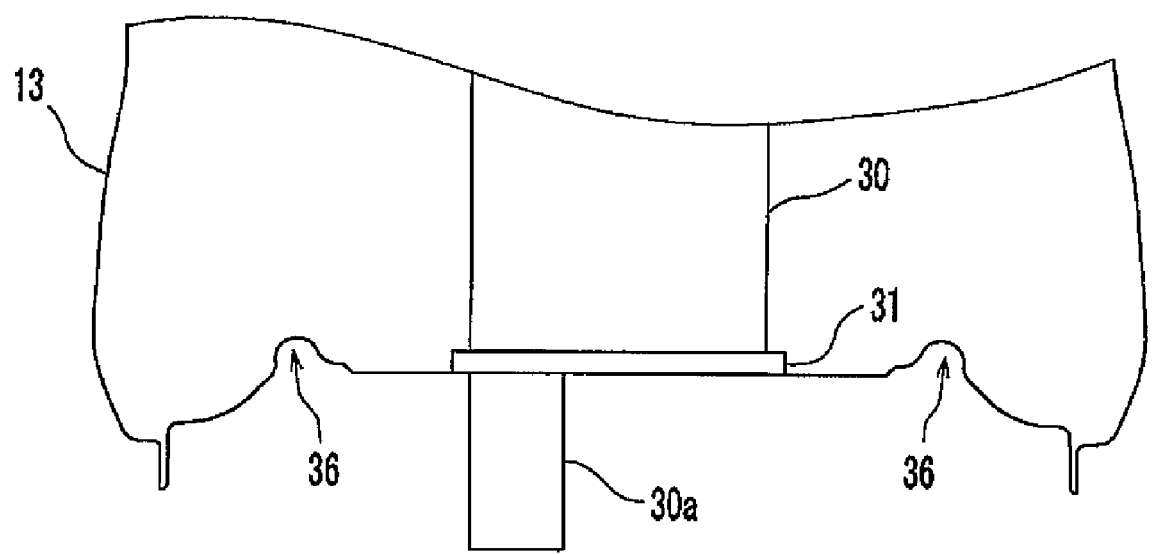

[Fig. 11]
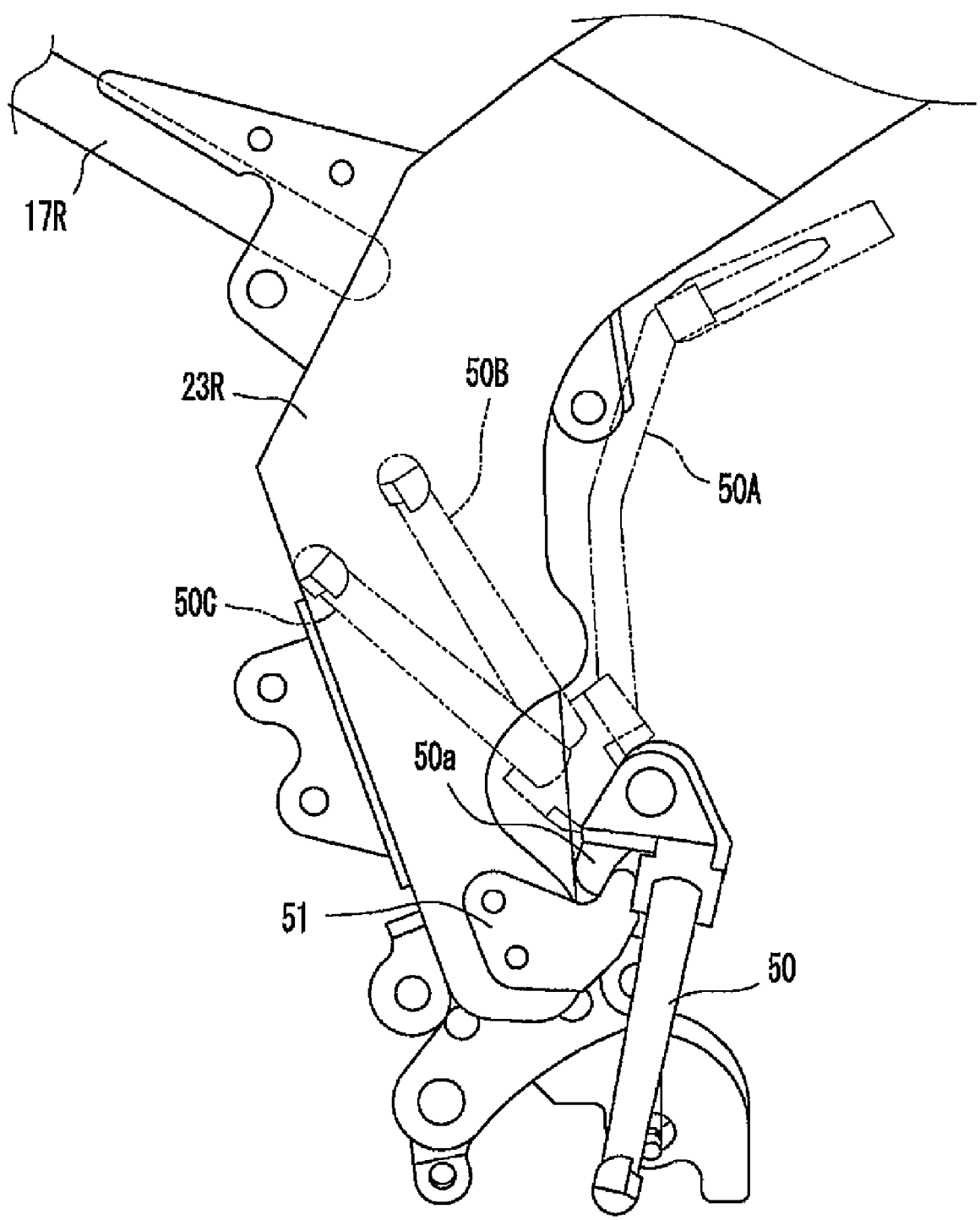

[Fig. 12]
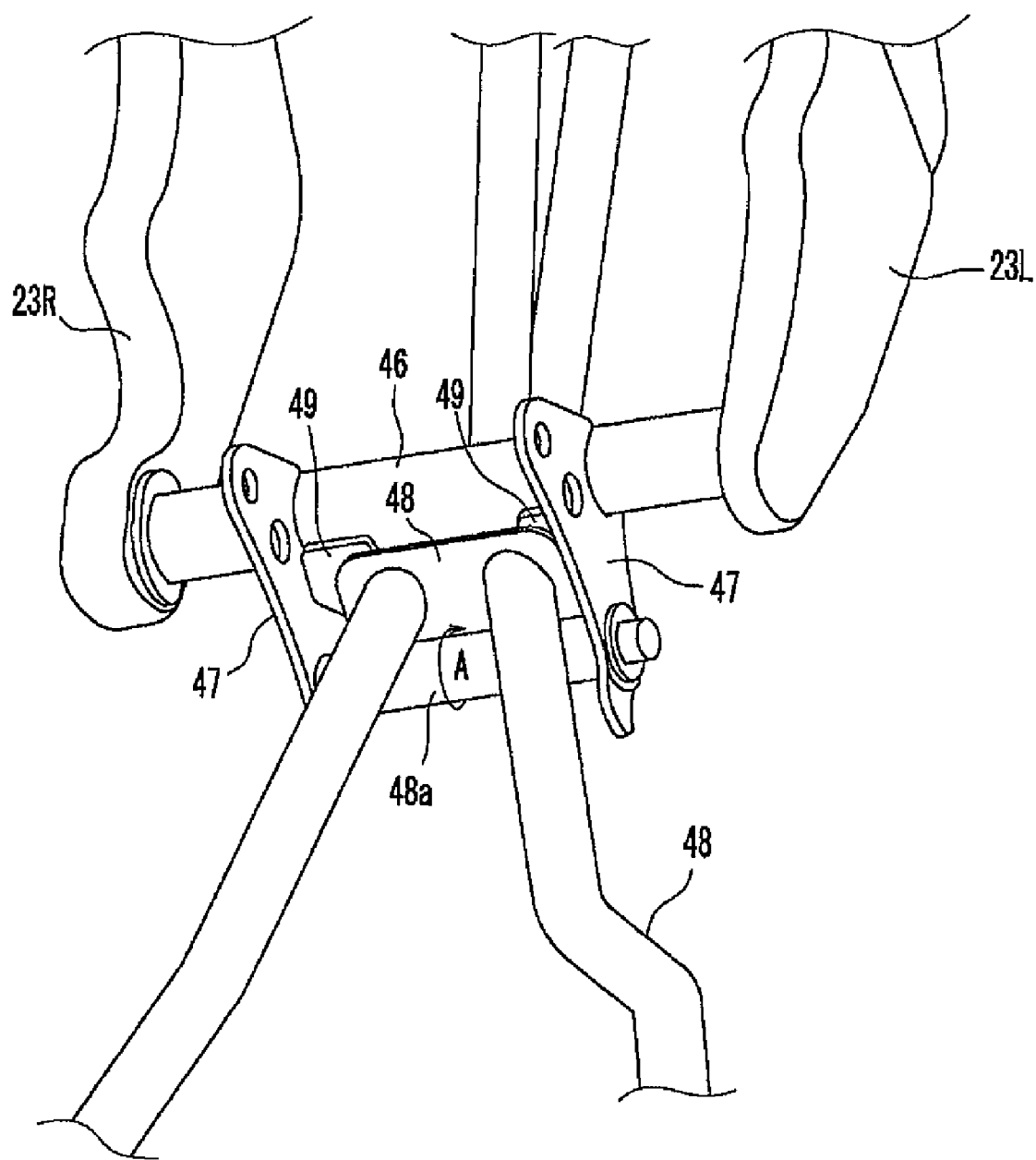

STRADDLE-TYPE VEHICLE

RELATED APPLICATIONS

This application claims the benefit of priority under 35 USC 119 of Japanese patent application no. 2005-323446, filed on Nov. 8, 2005, which application is hereby incorporated by reference in its entirety.

BACKGROUND OF THE INVENTION

1. Field of the Invention

The present invention relates to a straddle-type vehicle.

2. Description of Related Art

A straddle-type vehicle, such as a motorcycle, in which a seat is disposed behind a fuel tank may be constructed such that a cross member is disposed between right and left seat rails, and the rear of the fuel tank is supported by the cross member (for example, refer to JP-A-5-8780).

However, such a configuration imposes great limitations on the layout of other components in the vicinity of the rear of the fuel tank. That is, since the cross member that supports the rear of the fuel tank is disposed between the seat rails, it is obstructive to other components in the vicinity of the rear of the fuel tank. Therefore, the layout is not flexible and may result in a useless space around the cross member.

There is a strong demand, particularly in motorcycles, for increased air cleaner capacity and output. However, when the air cleaner is disposed in the vicinity of the rear of the fuel tank, the cross member is obstructive and makes it difficult to increase the capacity of the air cleaner.

SUMMARY OF THE INVENTION

The present invention is made in light of these circumstances and provides a straddle-type vehicle in which the seat is disposed behind the fuel tank, and in which the flexibility of the layout of the components in the vicinity of the fuel tank is improved and achieve efficient disposition (without useless space) of vehicle components is achieved.

A straddle-type vehicle according to the invention includes a body frame including a pair of right and left frames; a fuel tank supported at the front by the body frame; and a seat disposed behind the fuel tank. The pair of right and left frames each has a mounting portion separated to the right and left. The fuel tank has, at the rear, right and left mounted portions mounted to the mounting portions, respectively, and an upwardly projecting recess located between the mounted portions.

According to the invention, the right and left mounted portions at the rear of the fuel tank are fixed to the mounting portions of the right and left frames, respectively, so that the rear of the fuel tank is supported by the body frame. The fuel tank has a recess that projects upwardly at the rear between the mounted portions. Therefore, a sufficiently large space is formed under the rear of the fuel tank. This effective use of space increases the layout flexibility of other components (for example, an air cleaner, a suspension, and a battery). Disposing the components under the rear of the fuel tank allows efficient disposition of vehicle components.

According to the invention, the flexibility of the layout at the rear of the fuel tank is increased and efficient disposition of vehicle components is achieved.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to the invention.

FIG. 2 is a left side view of a body frame of the motorcycle of the invention.

FIG. 3 is a plan view of the body frame.

FIG. 4 is a back view of the body frame.

FIG. 5 is a left side view of a fuel tank of the motorcycle of the invention.

FIG. 6 is a bottom view of the fuel tank.

FIG. 7 is a back view of the fuel tank and an air cleaner of the motorcycle of the invention.

FIG. 8 is a perspective view of the fuel tank and the air cleaner as viewed from the upper left rear.

FIG. 9 is a plan view of a fuel tank according to the invention.

FIG. 10 is a conceptual sectional view of the projections and recesses of the bottom of the fuel tank.

FIG. 11 is a right side view of a rear-arm bracket according to the invention.

FIG. 12 is a perspective view of the base of a main stand as viewed from the lower left front according to the invention.

DETAILED DESCRIPTION OF THE INVENTION

Hereafter, an embodiment of the invention is described in detail based on the drawings.

As shown in FIG. 1, the straddle-type vehicle according to this embodiment is a motorcycle 10. The motorcycle 10 includes a body frame 11, a water-cooled single-cylinder engine 12 suspended and supported by the body frame 11, a fuel tank 13 supported by the body frame 11, and a seat 14. The seat 14 is disposed behind the fuel tank 13.

As shown in FIGS. 2-4, the body frame 11 includes a steering head pipe 15, a pair of right and left main frames 16R and 16L extending from the steering head pipe 15 toward the lower rear, rear-arm brackets 23R and 23R joined to the rear of the main frames 16R and 16L, a pair of right and left backstays 17R and 17L extending from the rear arm brackets 23R and 23L to the upper rear, and a pair of right and left seat rails 18R and 18L extending from the middle of the main frames 16R and 16L toward the upper rear, respectively. The rear ends of the backstays 17R and 17L are connected to the rear of the sheet rails 18R and 18L, respectively.

As shown in FIG. 1, a front fork 19 is rotatably supported by the steering head pipe 15. The front fork 19 has a steering handle 20 at its upper end, and rotatably supports a front wheel 21 at its lower end.

As shown in FIGS. 2 and 3, the main frames 16R and 16L have a vertical thickness larger than their lateral thickness (in the vehicle width direction), and are formed in the shape of a flat rectangular pipe having a vertically long cross section. As shown in FIG. 3, the main frames 16R and 16L are separated from the front parts 16a to the central parts 16b, and substantially in parallel from the central parts 16b to the rear. As shown in FIG. 2, the vertical thicknesses of the front parts 16a of the main frames 16R and 16L are almost equal to the vertical length of the steering head pipe 15. The vertical thicknesses of the main frames 16R and 16L decreases from the front parts 16a to the central parts 16b.

As shown in FIG. 3, a cross member 24 extending in the lateral direction (in the vehicle width direction) is disposed between the central part 16b of the left main frame 16L and the central part 16b of the right main frame 16R. The front ends 18a of the seat rails 18R and 18L are connected to the main frames 16R and 16L at the vicinity of the joint portion of the main frames 16R and 16L and the cross member 24 (refer to FIG. 2).

As shown in FIG. 5, the fuel tank 13 has a front upper surface 13a that inclines to the lower front and a rear upper surface 13c that inclines to the lower rear. The boundary between the front upper surface 13a and the rear upper surface 13c is an upper end 13b located at the uppermost surface of the fuel tank 13. The fuel tank 13 has, on both sides, front sides 13d that protrude laterally as they extend to the rear and rear sides 13e that protrude laterally as they extend to the front. The rear sides 13e face the occupant's knees during driving. Therefore, the rider can take a posture along the fuel tank 13 by opening the knees appropriately, and thus can ride with a comfortable posture.

As shown in FIG. 7, the rear of the fuel tank 13 has a recess 32 that projects upward as seen from the rear. Specifically, the recess 32 has curved pieces 32a extending downward from the center toward the right and left sides as seen from the back and a projecting piece 32b (refer to FIG. 5) that is located between the curved pieces 32a and that projects backward. Ring-shaped brackets 32c are provided at the lower ends of the curved pieces 32a.

The projecting piece 32b may smoothly continue to the curved pieces 32a. However, in this embodiment, the projecting piece 32b protrudes upward relative to the curved pieces 32a, and there is a step between the projecting piece 32b and the curved pieces 32a. Thus, the projecting piece 32b is located one step higher than the curved pieces 32a to form a large space under the projecting piece 32b.

The mounting structure for the fuel tank 13 is now described. As shown in FIG. 3, a bracket 25 that is substantially triangular, as viewed from the top, is joined to the top of the front parts 16a of the main frames 16R and 16L. The bracket 25 has mounting holes 25a. On the other hand, as shown in FIG. 6, the bottom plate 13k of the fuel tank 13 has mounting holes 33 corresponding to the mounting holes 25a of the bracket 25. The front part of the fuel tank 13 is fixed to the main frames 16R and 16L via the bracket 25 by tightening fastening devices such as bolts (not shown) into the mounting holes 25a and the mounting holes 33.

As shown in FIG. 8, brackets 34R and 34L extending upward are joined to the middle of the seat rails 18R and 18L, respectively. As shown in FIG. 7, the brackets 34R and 34L each have a pair of projections 34a and 34b arranged laterally side by side at a specified interval. The projections 34a and 34b project upward from the seat rails 18R and 18L. The projections 34a and 34b may either be formed in one piece or be formed separately. The projections 34a and 34b have mounting holes 34c (refer to FIG. 8) for a fastening device such as a bolt to pass through. As shown in FIG. 7, the right and left brackets 32c of the fuel tank 13 are placed between the projections 34a and 34b of each of the brackets 34R and 34L of the seat rails 18R and 18L. The rear part of the fuel tank 13 is mounted to the brackets 34R and 34L with a fastening device 35 such as a bolt that passes through the mounting holes 34c of the projections 34a and 34b and the brackets 32c.

The fuel tank 13 is rotatably mounted to the brackets 34R and 34L. Therefore, in a state in which the front part of the fuel tank 13 is not fixed to main frames 16R and 16L, the fuel tank 13 can be rotated with the brackets 32c as a fulcrum. This facilitates works on the vehicle components disposed under the fuel tank 13 by rotating the fuel tank 13 backward into a state in which it erects from the seat rail 18R and 18L.

As shown in FIG. 5, a fuel pump 30 is disposed inside the fuel tank 13. The fuel pump 30 is located at about the center of the fuel tank 13 in the front-back direction (in the lateral direction of FIG. 5). A fill opening 26 is provided in the front upper surface 13a of the fuel tank 13. A cylindrical part 27 with substantially the same diameter as that of the fill opening 26 is formed inside the fill opening 26. A stopper 28 extending in the lateral direction is provided at the lower end of the cylindrical part 27 so that an oil gun 27a may not contact the fuel pump 30 at the time of oil supply. Thus, when inserting the oil gun 27a through the fill opening 26, the tip of the oil gun 27a comes into contact with the stopper 28 to prevent the excessive insertion of the oil gun 27a. The fill opening 26 is closed by a lid 29 (refer to FIG. 1) except at the time of oil supply.

As shown in FIG. 9, the upper end 13b of the fuel tank 13 and the fuel pump 30 overlap as viewed from the top. That is, the fuel pump 30 is arranged in the vicinity of the upper end 13b of fuel tank 13, and in the position having the maximum space in the upper part of the interior of the fuel tank 13 (also see FIG. 5).

As shown in FIG. 5, the bottom plate 13k of the fuel tank 13 has a front bottom 13g inclined toward the upper front, a substantially horizontal center bottom 13h, and a rear bottom 13i inclined toward the lower front. The above-mentioned mounting holes 33 (refer to FIG. 6) are formed at the front bottom 13g. The center bottom 13h is located lower than the front bottom 13g and the rear bottom 13i.

As shown in FIG. 6, the center bottom 13h has a mounting washer 31 for mounting the fuel pump 30. The mounting washer 31 is shaped like a ring. The mounting washer 31 has a plurality of mounting holes 31a (six holes in this embodiment) spaced circumferentially at specified intervals. As shown in FIG. 5, the fuel pump 30 is mounted to the mounting washer 31 by inserting it into the fuel tank 13 through the central opening of the mounting washer 31, and then tightening fastening devices such as screws to the mounting holes 31a. The fuel pump 30 is therefore disposed at the lower part of the fuel tank 13.

As shown in FIG. 6, the bottom plate 13k of the fuel tank 13 has grooves (beads) 36 depressed upward to the right and left of the mounting washer 31 (also see FIG. 10). The grooves 36 extend substantially along the length of the fuel tank 13 (in the front-back direction).

As shown in FIG. 1, a pivot shaft 37 is provided to the rear-arm brackets 23R and 23L. The pivot shaft 37 pivotally supports the front end of the rear arm 38. The rear end of the rear arm 38 rotatably supports a rear wheel 39 serving as a driving wheel.

The engine 12 is supported by the main frames 16R and 16L and the rear-arm brackets 23R and 23L. The engine 12 has a cylinder 65 extending toward the upper front. The cylinder 65 as depicted comprises the whole body including the cylinder body and the cylinder head. The cylinder 65 may not necessarily extend obliquely upward but may extend upward. The cylinder 65 is connected to an air cleaner 41 via an intake pipe 40 and to a muffler 43 via an exhaust pipe 42.

One end of the intake pipe 40 is connected to the cylinder 65, and the other end of the intake pipe 40 is connected to the air cleaner 41. The intake pipe 40 is disposed lower than both the upper end 65t of the cylinder 65 and the upper end 41t of the air cleaner 41.

A joint portion 30a connected to a fuel supply pipe 61 is provided at the lower end of the fuel pump 30. The fuel ejected from the fuel pump 30 is conveyed to the fuel supply pipe 61 through the joint portion 30a and supplied through the fuel supply pipe 61 into the intake pipe 40. As shown in FIG.

1, the joint portion 30a is disposed higher than the main frames 16R and 16L as seen from the side (higher than the main frames 16R and 16L with reference to the same front-back direction).

A side cover 62 is mounted to the side of the body frame 11 and covers the side of at least part of the joint portion 30a. Therefore, the joint portion 30a cannot be viewed from the exterior.

The air cleaner 41 is formed in a longwise approximately rectangular parallelepiped shape. The vertical length of the air cleaner 41 is greater than any of the front-back length and the lateral length. Here, the vertical length, front-back length, and lateral length indicate the maximum of the vertical length, front-back length, and lateral length, respectively. The intake pipe 40 is connected to the bottom of the front of the air cleaner 41. An intake section 44 to take in air is formed at the upper rear of the air cleaner 41 (refer to FIG. 8). The intake section 44 has intake ports 44a open to the rear so that the air cleaner 41 can take air from the rear.

The air cleaner 41 is disposed at the lower rear of the fuel tank 13. Specifically, as shown in FIG. 1, the air cleaner 41 is disposed under the rear bottom 13i of the fuel tank 13. In this embodiment, the rear of the fuel tank 13 is supported by the seat rails 18R and 18L via the brackets 34R and 34L, respectively, and there is no cross member for supporting the rear of the fuel tank 13 between the right and left seat rails 18R and 18L. The air cleaner 41 can therefore be disposed in a higher position than is conventionally possible or increased in length in the vertical and horizontal directions (refer to FIG. 8). The upper end 41t of the air cleaner 41 (refer to FIG. 1) projects higher than the seat rails 18R and 18L. The upper end 41t of the air cleaner 41 is located higher than the upper ends of the brackets 34R and 34L. As a result, the fuel tank 13 and the air cleaner 41 overlap, as viewed from the side.

As shown in FIG. 8, a downward-extending bracket 55 is connected to each of the seat rails 18R and 18L. On the right and left sides of the air cleaner 41, externally extending mounting portions 41a are provided. The brackets 55 and the mounting portions 41a have a mounting hole 55a for a fastening device such as a screw to pass through. The air cleaner 41 is fixed to the bracket 55 with the fastening device. In this embodiment, the air cleaner 41 is supported only by the seat rails 18R and 18L via the brackets 55.

As shown in FIG. 7, the intake section 44 of the air cleaner 41 is disposed under the recess 32 on the back of the fuel tank 13, particularly, directly below the projecting piece 32b of the fuel tank 13. The projecting piece 32b extends toward the back of the intake section 44 to cover the upper part of the intake section 44.

As shown in FIG. 1, the seat 14 is supported by the seat rails 18R and 18L (refer also to FIGS. 2 and 3) via a bracket (not shown). The seat 14 is in the shape of a saddle, and has a forwardly projecting piece 45 on its back side that covers the upper part of the intake section 44 of the air cleaner 41 and that enters below the projecting piece 32b of the fuel tank 13.

As shown in FIG. 12, a laterally extending cross member 46 is built between the lower ends of the right and left rear-arm brackets 23R and 23L. A pair of right and left brackets 47 for suspending the engine 12 is connected to the cross member 46. The brackets 47 rotatably support the rotation shaft 48a of a main stand 48. That is, the brackets 47 serve as both the bracket for the engine 12 and the bracket for the main stand 48. In other words, the bracket for the engine 12 and the bracket for the main stand 48 are used in common.

As shown in FIG. 12, link brackets 49 are joined to the brackets 47. The link brackets 49 function also as a stopper of the main stand 48. When the main stand 48 is turned from the housed state to a standing state (when turned to the direction A in the drawing), the stopper 48b of the main stand 48 comes into contact with the link brackets 49, preventing an excessive turn of the main stand 48 to held it in a position.

FIG. 11 is a side view showing the right rear-arm bracket 23R of the motorcycle 10. The rear-arm bracket 23R is fitted at the lower front with a kick pedal 50, and at the lower end with a stopper 51 for preventing excessive rotation of the kick pedal 50. At kicking, the rider depresses the kick pedal 50 from the housed state (indicated by numeral 50A). As a result, the kick pedal 50 rotates counterclockwise, as viewed from the right side. When the kick pedal 50 rotates through more than a predetermined angle, the stopper 50a of the kick pedal 50 comes into contact with the stopper 51 to prevent the excessive rotation of the kick pedal 50. Numeral 50B indicates a state in which the kick pedal 50 is brought out of the housed state, and numeral 50C indicates the state of the kick pedal 50 during rotation.

When the stopper 51 for the kick pedal 50 is disposed at the crankcase of the engine 12, the stopper 51 is liable to cause limitation to the position of the pivot shaft 37 because the stopper 51 is obstructive. In contrast, the stopper 51 is mounted to the body frame 11 (strictly speaking, to the rear-arm bracket 23R) not to the engine 12. This arrangement decreases limitations on the position of the pivot shaft 37 and so on, and increases the flexibility of layout.

As described above, the rear of the fuel tank 13 is supported by the seat rails 18R and 18L via the brackets 34R and 34L, and the cross member for supporting the rear of the fuel tank 13 is not provided. The fuel tank 13 has, at the rear, the right and left ring-shaped brackets 32c mounted to the brackets 34R and 34L of the seat rails 18R and 18L and the upwardly projecting recess 32 (the curved pieces 32a and the projecting piece 32b) that is located between the ring-shaped brackets 32c. Thus, there is sufficient space under the rear of the fuel tank 13 that increases the flexibility of the layout of the vehicle components and that can be used as an installation space for another component (the air cleaner 41 in this embodiment, or alternatively, a suspension or a battery). Moreover, since the air cleaner 41 is disposed in the space, the air cleaner 41 can be disposed compactly.

In this embodiment, the brackets 34R and 34L extending upward from the seat rails 18R and 18L are used as mounting portions for mounting the rear of the fuel tank 13 to the seat rails 18R and 18L. This arrangement prevents the mounting portions from protruding inward in the lateral direction (in the vehicle width direction), providing a large space under the rear of the fuel tank 13.

In this embodiment, the mounted portions of the fuel tank 13 are the downwardly extending brackets 32c. This arrangement prevents the mounted portions of the fuel tank 13 from protruding laterally inward, thereby increasing the space under the rear of the fuel tank 13.

As described above, this embodiment ensures a large space under the rear of the fuel tank 13, in which the air cleaner 41 is disposed, and permits an increase in the capacity of the air cleaner 41, thus increasing the output of the engine 12.

In this embodiment, the upper end 41t of the air cleaner 41 projects higher than the seat rails 18R and 18L, and is located higher than the upper ends of the brackets 34R and 34L. Accordingly, the air cleaner 41 and the brackets 34R and 34L overlap as viewed from the side. Further, the fuel tank 13 and the air cleaner 41 overlap as viewed from the side. That is, part of the air cleaner 41 enters below the fuel tank 13, as viewed from the side. Since the upper part of the air cleaner 41 thus extends to a higher position, the capacity of the air cleaner 41 can be further increased, so that the engine output can be further increased.

The air cleaner 41 is longer in the vertical direction than in the front-back direction and the lateral direction, that is, it has a vertically long shape. This arrangement allows the space under the rear of the fuel tank 13 to be used effectively, eliminates wasted space and enables efficient arrangement of the air cleaner 41.

In order to increase the capacity of the air cleaner 41, it is also possible to increase the length of the air cleaner 41 in the front-back direction or the lateral direction. However, since other components (in this embodiment, the joint portion 30a of the fuel pump 30 and the battery 60) are often disposed in front and rear of the air cleaner 41, it is difficult to increase the front-back length of the air cleaner 41 because of limitation to the layout of the components. Moreover, increasing the lateral length of the air cleaner 41 results in an increase in the vehicle width, which is not desirable because it causes a bad riding posture of the rider.

The intake port 44a of the air cleaner 41 is disposed between the brackets 34R and 34L. Thus, the space between the brackets 34R and 34L is used effectively as the installation space for the intake port 44a. Moreover, the intake port 44a of the air cleaner 41 is disposed in a high position and prevents mud and dust flying up from the road from entering the air cleaner 41.

The projecting piece 32b at the rear of the fuel tank 13 covers the upper part of the intake port 44a of the air cleaner 41 and extends to behind the intake port 44a. This arrangement allows water flowing down along the fuel tank 13 to be received by the projecting piece 32b in the event of rain, thus preventing entry of water from above into the intake port 44a of the air cleaner 41.

The seat 14 has the forward projecting piece 45 which covers the upper part of the intake port 44a of the air cleaner 41 and which enters below the projecting piece 32b of the fuel tank 13. Accordingly, the forward projecting piece 45 also prevents the entry of water into the intake port 44a, thus preventing the entry of water into the air cleaner 41 more reliably.

The body frame 11 has the pair of right and left main frames 16R and 16L and the cross member 24 disposed between the main frames 16R and 16L. The front ends 18a of the seat rails 18R and 18L are connected to the vicinity of the joined portion of the main frames 16R and 16L and the cross member 24. This arrangement provides the body frame 11 with sufficient rigidity although no cross member is disposed between the seat rails 18R and 18L.

The air cleaner 41 is supported only by the seat rails 18R and 18L. This simplifies the support structure for the air cleaner 41.

The straddle-type vehicle of the invention is not limited to a motorcycle but may be another straddle-type vehicle such as a four-wheel buggy.

As has been described above, the invention is useful for a straddle-type vehicle such as a motorcycle.

The particular embodiments of the invention described in this document should be considered illustrative, rather than restrictive. Modification to the described embodiments may be made without departing from the spirit of the invention as defined by the following claims.

The invention claimed is:

1. A straddle vehicle comprising:
    a body frame including a pair of right and left frames;
    a fuel tank supported at a front by the body frame;
    a seat disposed behind the fuel tank, wherein
    each of the pair of right and left frames has a mounting portion separated to a right and left; and
    the fuel tank has, at a rear, right and left mounted portions mounted to the mounting portions, and an upwardly projecting recess located between the mounted portions to define a space between the mounting portions.

2. The straddle vehicle according to claim 1, wherein the mounting portions are brackets extending upward from the right and left frames.

3. The straddle vehicle according to claim 1, wherein the mounted portions are downward extending brackets.

4. The straddle vehicle according to claim 1, wherein no cross member for supporting the rear of the fuel tank is provided between the pair of right and left frames.

5. The straddle vehicle according to claim 1, further comprising an air cleaner disposed under the rear of the fuel tank.

6. The straddle vehicle according to claim 5, wherein the fuel tank and the air cleaner overlap in side view.

7. The straddle vehicle according to claim 5, wherein the air cleaner is longer in vertical length than in front-back length and in lateral length.

8. The straddle vehicle according to claim 5, wherein, an upper end of the air cleaner projects higher than the right and left frames.

9. The straddle vehicle according to claim 5, wherein
    the mounting portions are brackets extending upward from the right and left frames; and
    an upper end of the air cleaner is located above upper ends of the brackets.

10. The straddle vehicle according to claim 5 wherein
    the mounting portions are brackets extending upward from the right and left frames; and
    the air cleaner has an intake port between the brackets in a vehicle width direction.

11. The straddle vehicle according to claim 10, wherein the air cleaner and the mounting portions overlap in side view.

12. The straddle vehicle according to claim 5 wherein:
    the air cleaner has an intake port at a rear; and
    the fuel tank has a rear rim covering an upper part of the intake port and extending to behind the intake port.

13. The straddle vehicle according to claim 12 wherein the seat has a forward projecting piece covering the upper part of the intake port and entering below the rear rim of the fuel tank.

14. The straddle vehicle according to claim 1, wherein the right and left frames are seat rails supporting the seat.

15. The straddle vehicle according to claim 14, wherein:
    the body frame includes a pair of right and left main frames and a cross member disposed between the main frames; and
    front ends of the seat rails are connected to a vicinity of a joined portion of the main frames and the cross member.

16. The straddle vehicle according to claim 5, wherein:
    the right and left frames are seat rails supporting the seat; and
    the air cleaner is supported only by the seat rails.

17. A straddle vehicle comprising:
    a body frame including a pair of right and left frames, wherein each of the pair of right and left frames has a mounting portion separated to a right and left;

a fuel tank supported at a front by the body frame, wherein the fuel tank has, at a rear, right and left mounted portions mounted to the mounting portions, and an upwardly projecting recess located between the mounted portions;

a seat disposed behind the fuel tank; and an air cleaner disposed under the rear of the fuel tank, wherein at least a portion of the air cleaner is positioned between the mounting portions.

* * * * *